United States Patent
Di Taranto et al.

(10) Patent No.: US 9,985,816 B2
(45) Date of Patent: May 29, 2018

(54) DUAL CARRIER MODULATION WITH SINGLE CARRIER RECEPTION

(71) Applicant: Telefonaktiebolaget LM Ericsson (publ), Stockholm (SE)

(72) Inventors: Rocco Di Taranto, Lund (SE); Naveed Butt, Lund (SE); Leif Wilhelmsson, Dalby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 222 days.

(21) Appl. No.: 15/035,521

(22) PCT Filed: Apr. 18, 2016

(86) PCT No.: PCT/EP2016/058542
§ 371 (c)(1),
(2) Date: May 10, 2016

(87) PCT Pub. No.: WO2017/182050
PCT Pub. Date: Oct. 26, 2017

(65) Prior Publication Data
US 2018/0097680 A1 Apr. 5, 2018

(51) Int. Cl.
*H04L 27/28* (2006.01)
*H04L 5/06* (2006.01)
(Continued)

(52) U.S. Cl.
CPC ............... *H04L 27/28* (2013.01); *H04L 5/06* (2013.01); *H04L 27/2602* (2013.01);
(Continued)

(58) Field of Classification Search
CPC ....... H04L 27/28; H04L 27/2602; H04L 5/06; H04L 5/0007; H04W 72/08; H04B 1/69
See application file for complete search history.

(56) References Cited

U.S. PATENT DOCUMENTS

2004/0190641 A1 9/2004 Ojard
2005/0245258 A1 11/2005 Classon et al.
(Continued)

OTHER PUBLICATIONS

Wu et al. "LRLP potential technologies"; Retrieved from the internet: URL:https://mentor.ieee.org/802.11/dcn/16/11-16-0118-00-lrlp-lrlp-potentional-tech.pptx [retrieved on Dec. 15, 2016]; Jan. 18, 2016; pp. 1-6.
(Continued)

*Primary Examiner* — Vineeta Panwalkar
(74) *Attorney, Agent, or Firm* — Coats & Bennett, PLLC

(57) ABSTRACT

A method of a wireless terminal configured to operate in a wireless network using at least one wideband channel is disclosed.
The wireless terminal is configured to operate in a narrowband within the wideband channel. The network comprises at least one other wireless terminal configured to operate in the entire wideband channel, and at least one access point (AP). The AP is configured to support transmission and reception over the entire wideband channel, wherein the wideband channel is dividable into a plurality of resource units.
The method comprises receiving a trigger from the AP, wherein the trigger comprises an indication of a first resource unit and a second resource unit of the plurality of resource units on which the AP will transmit data intended to the wireless terminal using a dual carrier modulation (DCM) transmission and measuring a signal quality of the first and second resource units by measuring, in a frequency of the wideband channel which corresponds to the first and second resource unit, a reception quality of data transmitted from the AP to the at least one other wireless terminal.
The method also comprises determining which of the first and second resource units has a highest signal quality based
(Continued)

on the measured signal quality and receiving the DCM-transmission on the resource unit determined to have the highest signal quality.

Also disclosed is an arrangement of a wireless terminal and an access point, a method of an access point, an access point, a wireless terminal and a computer program product.

28 Claims, 4 Drawing Sheets

(51) Int. Cl.
*H04W 72/08* (2009.01)
*H04L 27/26* (2006.01)
*H04B 1/69* (2011.01)
*H04L 5/00* (2006.01)

(52) U.S. Cl.
CPC ............... *H04W 72/08* (2013.01); *H04B 1/69* (2013.01); *H04L 5/0007* (2013.01)

(56) References Cited

U.S. PATENT DOCUMENTS

2013/0150055 A1 6/2013 Laroia et al.
2015/0162970 A1 6/2015 Kamalizad et al.

OTHER PUBLICATIONS

Hon et al. "Diversity Mode in OFDMA"; IEEE Draft; IEEE 802.11-15/1327r0; XP068099287; Nov. 9, 2015; pp. 1-24; Piscataway, NJ.

Hon et al. "Scheduling Information for UL OFDMA Acknowledgement"; IEEE Draft; IEEE 802.11-15/1328r1; XP068099289; Nov. 11, 2015; pp. 1-17; Piscataway, NJ.

Li et al., "A Single-Antenna Dual-Carrier Selection Technique for Frequency Selective Fading Channels", International Conference on Cyber-Enabled Distributed Computing and Knowledge Discovery, Oct. 10, 2009, pp. 375-379, IEEE.

Sun, Y. et al., "Considerations on LRLP Transmissions", IEEE 802.11-16/xxxxr0, Jan. 16, 2016, pp. 1-10, IEEE.

Stacey, R. et al., "Specification Framework for TGax", doc.: IEEE 802.11-15/0132r8, Sep. 22, 2015, pp. 1-22.

RUs used for DCM to long range low power terminals

Decision regions for 4-level amplitude modulation in I-phase region

DUAL CARRIER MODULATION WITH SINGLE CARRIER RECEPTION

TECHNICAL FIELD

The present invention relates generally to the field of wireless communication. More particularly, it relates to dual carrier modulation (DCM) transmission in a network environment where long range, low power (LRLP) terminals operate.

BACKGROUND

For wireless communications, the channel conditions may vary significantly both in time and in frequency. The variation in time relates typically to how fast the transmitter and the receiver are moving, but may also to some extent relate to movements in the environment. The variations in frequency may typically relate to the channel's impulse response and in particular to the delay spread of the channel. When the delay spread of the channel is large, the channel variation in frequency is larger than if the delay spread is small.

If the bandwidth of the signal is large, e.g. 20 MHz, then the channel will typically vary considerably over the bandwidth, whereas if the bandwidth of the signal is relatively small, e.g. 1 MHz, the channel may often be approximated as being frequency flat within the bandwidth of the signal.

The numerical values used above to classify a signal as wideband and narrowband respectively are representative when the distance between the transmitter and the receiver is rather short, typically in the range of 10 to 100 meters. A situation where this is applicable is for instance for indoor communications using Wi-Fi. In cellular systems, where the distance between the transmitter and the receiver may be several kilometers, the experienced channel may vary significantly within, e.g. a bandwidth of 100 kHz.

In order to determine whether a channel should be considered as frequency flat (typically a narrowband channel) or frequency selective (typically a wideband channel), it is typically common to relate the root mean square (RMS) delay spread of the channel to the symbol rate, which in turn can be approximated as the same as the bandwidth of the signal. A channel can then typically be assumed to be frequency flat if the RMS delay spread of the channel is less than 10% of the symbol duration.

As an example, if the symbol rate is 1 Msymbols/s and the RMS delay spread is 50 ns, the channel can typically be assumed to be flat since the symbol time Ts=1 µs and thus the RMS delay spread is only 5% of the symbol duration.

A narrowband channel is typically smaller than the coherence bandwidth (i.e. the maximum range of frequency where the channel response is flat), and smaller than the wideband channel which typically exceeds the coherence bandwidth.

The terms wideband and narrowband are relative, and the sizes of the bands may typically be in kHz, MHz or GHz depending on the type of application used.

A frequency flat channel may typically have the advantage that the receiver may be constructed without the need for a channel equalizer. On the other hand, one typical disadvantage is that the entire channel may be bad, i.e., the entire channel may simultaneously be experiencing weak signal conditions due to fading.

The latter issue, i.e., that the channel is experiencing bad signal conditions due to fading, may for instance be counteracted by changing the used frequency on a regular basis. This is the idea behind frequency hopping. The change of frequency may for instance be between packets, like in Bluetooth Wireless Technology, but it can in principle also be between symbols.

In any event, applying frequency hopping typically leads to that the wireless link will not experience fading conditions constantly or for longer periods of times, and therefore the system performance will typically depend on the average (over the frequencies) channel performance rather than the worst case conditions.

One simple means to obtain frequency diversity is by using dual carrier modulation (DCM). In DCM, the same information is typically transmitted on two resource units (RUs), and the receiving side then combines the information received on the two carriers.

In order to not degrade the transmission rate, the amount of information sent on each one of the carriers used for DCM is doubled. As an example, an access point (AP) operating in a Wi-Fi network is to send information to two wireless terminals operating in the same network, and binary phase shift keying (BPSK) is used for both wireless terminals. If DCM is not used, then the available bandwidth could typically be shared between the two terminals such that the first terminal is allocated to the lower frequency part of the channel whereas the second terminal is allocated to the upper frequency part of the channel. However, with DCM, the information is instead typically repeated for the two terminals such that the same information is sent on both the lower and the upper part of the band. However, in order to achieve this, quadrature phase shift keying (QPSK) is typically used instead of binary phase shift keying (BPSK).

Although the reception of signals transmitted by means of DCM will typically be slightly more complex, there may be a significant gain due to the increased frequency diversity.

However, one of the basic ideas of DCM is typically that the receiver is able to receive both carriers and then combine them. If DCM is used when the receiver of a terminal is only able to receive one of the sub-carriers, there typically arises a significant risk of inferior reception due to data losses.

A situation where the receiver is only able to receive one of the carriers may e.g. occur when the receiver is part of a very inexpensive and power efficient implementation (e.g. a LRLP receiver). These types of implementations are typically expected to increase. A terminal having a LRLP receiver may typically be denoted as a narrowband terminal i.e. a terminal operating in a limited frequency range, typically such that the frequency range is frequency flat.

A wideband terminal, on the other hand is typically operating in a wide frequency range, where the frequency range is typically frequency selective. The wideband terminal is typically further equipped with a transceiver capable of receiving on multiple carriers.

Hence there exists a problem in that DCM in its basic form is not well suited for being used with narrowband (LRLP) receivers.

In "A single-antenna dual-carrier selection technique for frequency selective fading channels" by Jingli Li, Gang Zhao and Xiangqian Liu, a diversity technique for single-antenna systems in frequency-selective channels is presented. Assuming that the channel band is divided into multiple subchannels, symbols are transmitted on two frequency hopped subchannels simultaneously. To keep the total transmission power constant, the signal power in each of the two subchannels is reduced to half of what would be in single channel transmission. At the receiver selection diversity is employed by decoding the subchannel with the larger gain. Furthermore, channel diversity can be obtained by combining complex-field coding (CFC) with the dual carrier selection design.

However, dual carrier selection demands large spectrum resources as the used spectrum is doubled, and the paper does not provide a solution for how the receiver may determine which channel has the largest gain.

Therefore, there is a need for wireless terminals and access points that enables reliable wireless communication regardless of transmission and reception abilities.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of some embodiments to mitigate at least some of the above disadvantages and to provide methods and arrangements of a wireless terminal and an access point operating in a wireless network which enables reliable communication in systems where terminals with limited frequency range, long range and low power (i.e. narrowband terminals) operate concurrently with terminals with a large frequency range (i.e. wideband terminals).

According to a first aspect, this is achieved by a method of a wireless terminal configured to operate in a wireless network using at least one wideband channel. The terminal is configured to operate in a narrowband channel within the wideband channel, and the network comprises at least one other wireless terminal configured to operate in the entire wideband channel.

The network further comprises at least one access point—AP. The AP is configured to support transmission and reception over the entire wideband channel.

The wideband channel is dividable into a plurality of resource units.

The method comprises receiving a trigger from the AP, wherein the trigger comprises an indication of a first resource unit and a second resource unit of the plurality of resource units on which the AP will transmit data intended to the wireless terminal using a dual carrier modulation—DCM—transmission.

The method also comprises measuring a signal quality of the first and second resource units by measuring, in a frequency of the wideband channel which corresponds to the first and second resource units, a reception quality of data transmitted from the AP to the at least one other wireless terminal.

The method also comprises determining which of the first and second resource units has a highest signal quality based on the measured signal quality and receiving the DCM-transmission on the resource unit determined to have the highest signal quality.

In some embodiments, the trigger is a trigger frame.

In some embodiments, the transmitted data are data packets.

In some embodiments, the transmitted data are synchronization signals.

In some embodiments, the transmitted data are control signals.

In some embodiments, the narrowband channel has a smaller frequency range than the wideband channel.

In some embodiments, the frequency range of the narrowband channel is about 10 percent of the frequency range of the wideband channel.

E.g. in some embodiments, the frequency range of the narrowband channel may be between 8 to 12 percent of the frequency range of the wide band channel. E.g. 10 percent.

In some embodiments, the narrowband channel can be treated as being frequency flat, and the wideband channel as being frequency selective.

E.g. in some embodiments the narrowband channel is frequency flat, and the wideband channel is frequency selective.

In some embodiments, a dual carrier modulation transmission means that the same information is transmitted on two carriers.

In some embodiments, measuring the signal quality of the first and second resource units may comprise measuring a received transmission power of the transmitted data to the at least one other wireless terminal.

In some embodiments, measuring the quality of the first and second resource units may comprise measuring a received signal strength indication (RSSI) of the transmitted data to the at least one other wireless terminal.

In some embodiments, the wireless terminal first measures the quality of the first resource unit, and then measures the quality of the second resource unit, or vice versa.

In some embodiments, if the wireless terminal determines that both resource units are of inferior quality, it may refrain from receiving the transmission on either resource unit and instead entering a power saving mode.

In some embodiments, the quality of the resource units may be compared to a quality requirement.

In some embodiments, the quality requirement may be that the transmitting power and/or RSSI should be above a determined threshold, e.g. 100 dB. The threshold may be dynamically set and vary based on overall network conditions and parameters such as size of the network, topology, location etc.

In some embodiments, the plurality of resource units may comprise at least one of 26 sub-carriers, 52 sub-carriers and 106 sub-carriers.

In some embodiments, a frequency range of the narrowband channel may correspond to the frequency of a single 26 sub-carrier resource unit, a single 52 sub-carrier resource unit or a single 106 sub-carrier resource unit.

In some embodiments, a frequency range of the narrowband channel may correspond to the frequency of at least two 26 sub-carrier resource units, at least two single 52 sub-carrier resource units or at least two 106 sub-carrier resource units.

In some embodiments, the first and the second resource unit are not adjacent in frequency.

In some embodiments, the wireless terminal measures the signal quality during a measurement period.

In some embodiments, the trigger may further comprise a transmission time indication indicative of the length of the measurement period.

In some embodiments, the trigger may further comprise a transmission time indication indicative of a time when the AP will transmit the DCM-transmission. The method may further comprise measuring the quality of the first and second resource unit during a time period between receiving the trigger and the time indicated for the DCM-transmission, and listening for and receiving the DCM-transmission at the time indicated by the trigger.

In some embodiments, the measurement period is the time period between receiving the trigger and the time indicated for the DCM-transmission.

In some embodiments, the trigger may further comprise a transmission time indication indicative of a number of down link (DL) frames to the one or more other wireless terminal following the transmission of the trigger.

In some embodiments, the trigger may always be followed by a predetermined number of DL frames, and the time indication is indicative of the length of the frames.

In some embodiments, the measurement period may be the duration of the number of DL-transmissions following the trigger.

In some embodiments, the transmission from the AP may be specifically coded such that the wireless terminal can decode them. E.g., the transmissions from the AP may comprise a source address, which the wireless terminal is able to decode. Once the transmission has been decoded by the wireless terminal, it will know that it can use the transmission for estimating channel quality.

In some embodiments, the DCM transmission is encoded by the AP using a quadrature phase shift keying—QPSK—signal, wherein the wireless terminal receives the DCM-transmission in an in-phase component of the QPSK signal, or in a quadrature-phase component of the QPSK signal. The trigger may further comprise an indication informing the wireless terminal of which phase component the wireless terminal will receive the DCM-transmission in.

The method may method further comprise receiving the DCM-transmission in the indicated phase component on the resource unit determined to have the highest signal quality.

In some embodiments, the QPSK-signal may comprise two binary phase shift keying—BPSK—signals encoded in the QPSK signal repeated on the first and second resource units.

In some embodiments, the DCM transmission is encoded by the AP using a 16-Quadrature Amplitude Modulation (16-QAM) signal.

In some embodiments, the type of modulation may be determined based on a quality of a link between the AP and the wireless terminal.

In some embodiments, the method further comprises receiving a second trigger frame from the AP indicating whether the wireless terminal is allowed to transmit data in an upcoming uplink slot, and transmitting the data in the uplink slot to the AP on the resource unit determined to have the highest signal quality.

A second aspect is a method of an access point—AP—configured to operate in a wireless network using at least one wideband channel. The wireless network comprises at least a first wireless terminal configured to operate in a narrowband channel within the wideband channel, and at least one other wireless terminal configured to operate in the entire wideband channel.

The AP supports transmission and reception over the entire wideband channel and the wideband channel is dividable into a plurality of resource units.

The method comprises determining a first and a second resource unit of the plurality of resource units to be used for transmitting data to the first wireless terminal using a dual carrier modulation—DCM—transmission.

The method also comprises transmitting a trigger to the first wireless terminal, wherein the trigger comprises an indication of the first resource unit and the second resource unit on which the AP will transmit data intended to the first wireless terminal.

The method may also comprise transmitting data to the at least one other wireless terminal during a measurement period, wherein the data is transmitted in a frequency of the wideband channel which includes the first and second resource units and is suitable for measurement, by the first wireless terminal, of a quality of the first and second resource units.

The method also comprises determining whether the measurement period has expired, and if so, transmitting data intended to the first wireless terminal on the first and the second resource unit using DCM-transmission.

E.g. the AP may transmit data on all of the plurality of resource units. In that way the data which is transmitted in a frequency which corresponds to, and or includes, the first and second resource units may be utilized by the wireless terminal for signal quality measurements of the first and second resource units.

In some embodiments, the AP may transmit data over a subset of the plurality of RUs, which subset includes the frequency corresponding to the first and second RUs.

In some embodiments, the method may further comprise retransmitting the trigger if the AP determines that the wireless terminal has not received it.

In some embodiments, the AP may determine that the wireless terminal has not received the trigger if no transmission is received from the wireless terminal when a transmission is expected.

E.g. a transmission from the wireless terminal to the AP may be expected if the AP has ordered the wireless terminal to transmit UL-data to the AP.

In some embodiments, the AP may require an acknowledgement from the wireless terminal that it has received the trigger, wherein the trigger is retransmitted if the acknowledgement is not received.

In some embodiments, the plurality of resource units may comprise at least one of 26 sub-carriers, 52 sub-carriers and 106 sub-carriers.

In some embodiments, the AP may determine the first and the second resource unit such that they are not adjacent in frequency.

In some embodiments, the trigger may further comprise a transmission time indication indicative of a time when the AP will transmit the DCM-transmission on the indicated first and second resource units.

In some embodiments, the trigger may be transmitted to a second wireless terminal configured to operate in the narrowband channel within the wideband channel, wherein the trigger may indicate that the first and the second wireless terminal will receive the DCM transmission on the first and the second resource units.

In some embodiments, the DCM transmission may be encoded using a quadrature phase shift keying—QPSK—signal wherein the first wireless terminal receives the DCM-transmission in an in-phase component of the QPSK signal, and the second wireless terminal receives the DCM-transmission in a quadrature-phase component of the QPSK signal, or vice versa.

In some embodiments, the AP may encode the DCM transmission using a 16-quadrature amplitude modulation (16-QAM) signal.

In some embodiments, the trigger may further comprise an indication informing the first and second wireless terminal of which phase component the respective terminal will receive the DCM-transmission on.

A third aspect is a computer program product comprising a computer readable medium, having thereon a computer program comprising program instructions, the computer program being loadable into a data-processing unit having a memory and a processor and adapted to cause execution of the method according to any of first and second aspects when the computer program is run by the data-processing unit.

A fourth aspect is an arrangement of a wireless terminal configured to operate in a wireless network using at least one wideband channel. The wireless terminal is configured to operate in a narrowband channel within the wideband channel, wherein the network comprises at least one other wireless terminal configured to operate in the entire wideband channel, and at least one access point—AP. The AP is configured to support transmission and reception over the entire wideband channel, wherein the wideband channel is dividable into a plurality of resource units.

The arrangement comprises a controller configured to cause reception of a trigger from the AP, wherein the trigger comprises an indication of a first resource unit and a second resource unit of the plurality of resource units on which the AP will transmit data intended to the wireless terminal using a dual carrier modulation—DCM—transmission.

The controller also causes measurement of a signal quality of the first and second resource units by measuring, in a frequency of the wideband channel corresponding to the first and second resource unit, a reception quality of data transmitted from the AP to the at least one other wireless terminal.

The controller also causes determination of which of the first and second resource units has a highest signal quality based on the measured signal quality and further causes reception of the DCM-transmission on the resource unit determined to have the highest signal quality.

In some embodiments, the plurality of resource units may comprise at least one of 26 sub-carriers, 52 sub-carriers and 106 sub-carriers.

In some embodiments, the first and the second resource unit are not adjacent in frequency.

In some embodiments, the trigger further comprises a transmission time indication indicative of a time when the AP will transmit the DCM-transmission. The controller may be further configured to cause measurement of the signal quality of the first and second resource units during a time period between receiving the trigger and the time indicated by the trigger for receiving the DCM-transmission.

The controller is further configured to cause listening for and reception of the DCM-transmission at the time indicated by the trigger.

In some embodiments, the controller may further comprise a timer configured to set a first time period during which signal quality measurements are performed on the first resource unit, and a second time period during which quality measurements are performed on the second resource unit.

In some embodiments, the first time period during which signal quality measurements are performed on the first resource unit, and the second time period during which signal quality measurements are performed on the second resource unit sums up to equal the time period between receiving the trigger and the time indicated for the DCM transmission.

In some embodiments, the arrangement may further comprise a measurement unit configured to perform the signal quality measurements of the first and second resource units.

In some embodiments, the arrangement may further comprise a determiner configured to determine which of the first and second resource units has the highest signal quality, based on the signal quality measurements.

In some embodiments, the quality measurements may be one or more of measurements of received signal strength indicator, signal power, channel throughput, channel attenuation or the like.

In some embodiments, the DCM transmission may be encoded by the AP using a quadrature phase shift keying—QPSK—signal. The controller may be configured to cause the reception of the DCM-transmission in an in-phase component of the QPSK signal, or in a quadrature-phase component of the QPSK signal. The trigger may further comprise an indication informing the terminal of which phase component the terminal will receive the DCM-transmission in, wherein the controller may be further configured to cause the reception the DCM-transmission in the indicated phase component.

In some embodiments the controller may be further configured to cause the reception of a second trigger frame from the AP indicating whether the terminal is allowed to transmit data in a coming uplink slot, and to cause the transmission of the data in the uplink slot to the AP on the resource unit having the highest signal quality.

A fifth aspect is a wireless terminal comprising the arrangement according to the fourth aspect.

A sixth aspect is an arrangement of an access point—AP—configured to operate in a wireless network using at least one wideband channel. The wireless network comprises at least a first wireless terminal configured to operate in a narrowband channel within the wideband channel, and at least one other wireless terminal configured to operate in the entire wideband channel. The AP is configured to support transmission and reception over the entire wideband channel, wherein the wideband channel is dividable into a plurality of resource units.

The arrangement comprises a controller configured to cause determination of a first and a second resource unit of the plurality of resource units to be used for transmitting data to the first wireless terminal using a dual carrier modulation—DCM—transmission.

The controller is also configured to cause transmission of a trigger to the first wireless terminal, wherein the trigger comprises an indication of the first resource unit and the second resource unit on which the AP will transmit data intended to the first wireless terminal.

The controller is also configured to cause the transmission of data to the at least one other wireless terminal during a measurement period, wherein the data is transmitted in a frequency of the wideband channel which includes the first and second resource units and is suitable for measurements, by the first wireless terminal, of a signal quality of the first and second resource units.

The controller is also configured to cause determination of whether the measurement period has expired, and if so, cause transmission of data intended to the first wireless terminal on the first and the second resource unit using DCM-transmission.

In some embodiments, the controller may be configured to cause transmission of data on all of the plurality of resource units. In that way the data which is transmitted in a frequency which corresponds to, and/or includes, the first and second resource units may be utilized by the wireless terminal for signal quality measurements of the first and second resource units.

In some embodiments, the controller may be configured to cause transmission of data on a subset of the plurality of resource units, which subset includes the frequency corresponding to the first and second resource units.

In some embodiments, the plurality of resource units may comprise at least one of 26 sub-carriers, 52 sub-carriers and 106 sub-carriers.

In some embodiments the controller may be configured to cause the determination of the first and the second resource unit such that they are not adjacent in frequency.

In some embodiments, the trigger may further comprise a transmission time indication indicative of when the AP will transmit the DCM-transmission on the indicated first and second resource units.

In some embodiments, the arrangement may further comprise a timer configured to determine whether the measurement period has expired In some embodiments, the timer may further be configured to determine if the time for the DCM-transmission has been reached.

In some embodiments, the controller may further be configured to cause the transmission of the trigger to a second wireless terminal configured to operate in the narrowband within the wideband channel, and wherein the trigger further indicates that the first and the second wireless terminal will receive the DCM-transmission on the first and the second resource units.

In some embodiments, the controller may further be configured to cause the encoding of the DCM transmission using a quadrature phase shift keying—QPSK—signal. The controller is configured to cause the transmission of the DCM-transmission to the first wireless terminal in an in-phase component of the QPSK signal, and the transmission of the DCM-transmission to the second wireless terminal in a quadrature-phase component of the QPSK signal, or vice versa.

In some embodiments, the controller may be further configured to include in the trigger an indication informing the first and second wireless terminal of which phase component the respective terminal will receive the DCM-transmission in.

In some embodiments, the arrangement may further comprise a modulating unit configured to encode the DCM-transmission.

In some embodiments, the modulating unit may be configured to encode the DCM transmission using a 16-quadrature amplitude modulation signal.

In some embodiments, the modulating unit may be configured to encode the DCM transmission using a 2 level amplitude modulation or a 4-level amplitude modulation.

In some embodiments, the arrangement may further comprise a resource unit determiner configured to determine which resource units out of the plurality of resource units should be indicated in the trigger.

In some embodiments, the resource unit determiner may be further configured to determine the first and second resource units such that they are not adjacent in frequency.

A seventh aspect is an access point comprising the arrangement according to the sixth aspect.

In some embodiments, the second, fourth, fifth, sixth and seventh aspects may additionally share or have identically or corresponding features described for any of the aspects, and may additionally have features identical with or corresponding to any of the various features as explained above for the first aspect.

An advantage of some embodiments is that robust communication with low performance loss is enabled in a wireless network comprising terminals having a single carrier transceiver (narrowband transceiver) and terminals having a dual carrier transceiver (wideband transceiver).

Another advantage of some embodiments is that DCM-transmission may be advantageously utilized even if a terminal can only receive and transmit on one carrier.

Another advantage of some embodiments is that the AP does not have to be aware of which RU the wireless terminal determines to receive the DCM transmission on.

Another advantage of some embodiments, is that a wireless network is enabled where signal overhead and risk of congestions is low.

Another advantage is that terminal having an inexpensive and power efficient implementation may still benefit from DCM-transmissions.

Another advantage of some of the embodiments is that frequency flat terminals and frequency diverse terminals can operate concurrently on the same bandwidth without affecting over all network performance.

BRIEF DESCRIPTION OF THE DRAWINGS

Further objects, features and advantages will appear from the following detailed description of embodiments, with reference being made to the accompanying drawings, in which.

DETAILED DESCRIPTION

In the following, embodiments will be described where reliable communication is achieved by means of wireless terminals configured for narrowband operations in wideband wireless network environments receiving DCM-transmissions from an access point (AP) on one carrier.

It is to be noted, that the term terminal may in this disclosure be interpreted e.g. as a wireless communication device (such as a mobile phone, smart phone, surf pad, lap top, a network station or the like).

In the same manner, the term access point (AP) may e.g. be a network node, an eNB, a base station or the like.

Furthermore, in this disclosure, the term wireless terminal and terminal may be used interchangeably.

The term narrowband terminal is to be interpreted as a terminal operating in a limited frequency range, i.e. only a part of the frequency range supported by e.g. the AP. The narrowband terminal may furthermore be equipped with a long range low power transceiver only able to transmit and receive on a single carrier.

The term wideband terminal is to be interpreted as terminal operating in a wide frequency range (i.e. typically capable of receiving and transmitting over the entire bandwidth of a channel), such that the frequency range is typically frequency selective. The wideband terminal is further equipped with a transceiver capable of receiving on multiple carriers.

DCM provides more reliable communication, compared to e.g. single carrier modulation, since the same information is transmitted on two different carriers, wherein the receiver side typically combines the information received on the two carriers. Thus, if information received on one carrier is faulty due to bad channel conditions caused e.g. by noise, congestion on the channel, low signal quality, etc., it may be complemented by the information received on the other channel. The probability that both channels experience inferior signal quality at the same time is significantly less, which in turn leads to a stable and reliable overall performance in the network.

In order to achieve DCM transmission, QPSK modulation is typically used and the wideband of the network channel is typically divided into a plurality of resource units (RUs).

Figure 1:
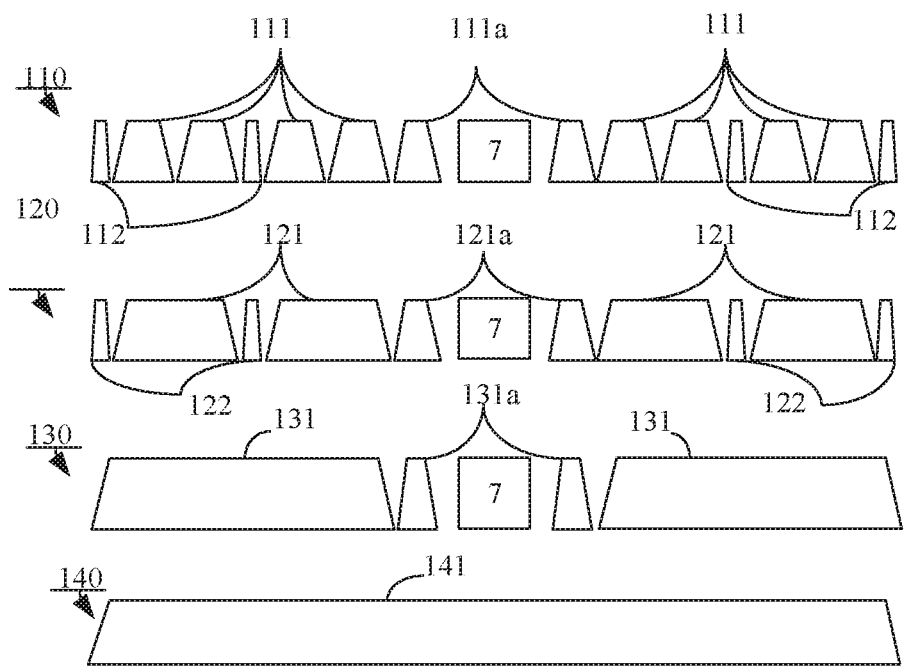
FIG. 1 is a schematic drawing illustrating an example division of a channel into resource units according to some embodiments.

FIG. 1 illustrates how a bandwidth may be divided into RUs. In FIG. 1 an IEEE 802.11 system using orthogonal frequency division (OFDM) is assumed. The nominal channel bandwidth is 20 MHz, and a signal is generated using a 256 point inverse fast Fourier transform (IFFT). The spacing between the sub-carriers then becomes 20/256 MHz=78.125 kHz. The duration of one OFDM symbol is 256/20 s=12.8 is (not including the cyclic prefix (CP)).

For IEEE 802.11 ax it is proposed to use orthogonal frequency division multiple access (OFDMA) to allow simultaneous transmission to and from several terminals.

Depending on the amount of information to be transmitted to a terminal, the terminal may be allocated more or less of the total available bandwidth.

As seen in FIG. 1, RUs can comprise different amount of sub-carriers depending on the need.

Bandwidth 110, 120, 130 and 140 each illustrates different sizes of RU.

The smallest amount of sub-carriers making up a RU is 26 sub-carriers which is illustrated in bandwidth 110 by the 9 resource elements 111, 111$a$ which comprises 26 sub-carriers each. Resource element 111$a$ is divided by a group of unused tones, in this case seven direct currents 7. A 26 sub-carrier RU corresponds to a bandwidth of about 2 MHz (26*78.125 kHz=2.031 MHz). Also present in bandwidth 110 is four left over tones 112.

Bandwidth 120 comprises five resource elements 121, 121$a$ comprising 52-subcarriers each. Resource element 121$a$ is divided by a group of unused tones, in this case seven direct currents 7, and the band 120 further comprises four leftover tones 122.

Bandwidth 130 comprises three resource elements 131 comprising 106 sub-carriers. Resource element 131$a$ is divided by a group of unused tones, in this case seven direct currents 7

Bandwidth 140 comprises one resource unit 141 comprising 242 sub-carriers.

Bandwidths 110, 120, 130, 140 are generally flanked by guard sub-carriers (not shown) separating them from other bandwidths or channels.

In general, a RU may comprise 26 sub-carriers (top row 110 in FIG. 1), 52 sub-carriers (second row 120 in FIG. 1), 106 sub-carriers (third row 130 in FIG. 1) or 242 sub-carriers (bottom row 140 in FIG. 1) which correspond to the entire bandwidth of the channel.

An AP is typically configured such that it supports transmission and reception over the entire 20 MHz bandwidth of the channel. However, a narrowband terminal operating according to long range, low power (LRLP) may only be capable of receiving and transmitting over a single 26, 52 or 106 sub-carrier resource unit, whereas a wideband terminal may utilize the entire bandwidth.

If a narrowband terminal is capable of receiving and transmitting over the entire channel (corresponding to receiving and transmitting on the 242 sub-carrier RU) there is no need for determining which ones of the narrowband resources should be received as both of them can be received simultaneously.

Although the embodiments described herein may be applied to any of the above described division into RUs (i.e. 26, 52, 106, sub-carriers), in the following, embodiments will be described where a narrowband terminal is only capable of receiving and transmitting over a 26 sub-carrier resource unit. This scenario is typically applicable for applications that only require low data rates. Furthermore, the terminal may e.g. have a LRLP transceiver which has a considerably lower power consumption compared to a terminal having a wideband transceiver.

In this scenario, DCM may be realized by allocating two RUs comprising e.g. 26 subcarriers each (e.g. two of 26 sub-carrier RUs illustrated in FIG. 1).

In order to mitigate the risk that data sent on both RUs are being subjected to bad channel conditions, the RUs should be chosen such that they are sufficiently separated in frequency. It is therefore not desirable to chose adjacent, or close to adjacent, RUs for data transmission when using DCM. E.g. the first and second RU should preferably be chosen such that there are two or more, or at least one, other RU between them.

Figure 2:
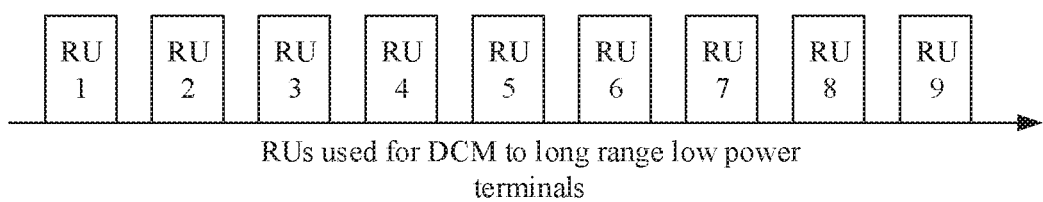
FIG. 2 is a schematic drawing illustrating an example of how resource units may be spread in a channel according to some embodiments.

FIG. 2 illustrates 9 RUs comprising a number of sub-carriers (e.g. 26 as described in FIG. 1). In some examples, the number of sub-carriers may be different, e.g. 52 or 106.

RU 1 and RU 4 may e.g. be chosen for the DCM transmission to a narrowband terminal. In the same manner, RU 4 and RU 8, or RU 1 and RU 6 may be suitable, whereas choosing RU 4 and RU 6, or RU 1 and RU 2 may be an unwise choice due to their proximity in frequency. Other constellations of RUs are of course possible, as would easily be understood by a skilled person.

However, it is to be understood that sufficient frequency separation may vary based on network parameters such as signal strength, signal quality, geography, network topology, amount of terminals within the network, etc.

E.g. a network where the signal strength and quality is good may not necessarily need an as large frequency gap between the RUs, as a network having inferior signal quality.

As mentioned above a problem arises when DCM is used for transmission to the narrowband terminal having a LRLP receiver (or transceiver) which is only capable of receiving data on one (e.g.) 26 sub-carrier RU. In this case, the terminal cannot benefit from the data being sent on two RUs. The risk of data loss and degraded communication is probable in this scenario.

As elaborated on above, one of the purposes of DCM is largely that the probability that both RUs used for transmission will experience poor channel conditions is very low, and therefore by combining them a diversity gain will be obtained.

However, if a narrowband terminal with a LRLP receiver selects one of the two RUs used for DCM randomly, there is a risk that no diversity gain is achieved.

In fact, as the same signal is sent on two RUs, the transmitted power is reduced by 3 dB for each one of the RU in order to keep the total power the same. However, if the LRLP receiver has the capability to select the better of the two RUs, there will still be a significant diversity gain, although somewhat smaller than if both RUs would have been processed.

According to some embodiments, a narrowband terminal can benefit from data transmissions sent from the AP to other terminals (and in particular to wideband terminals) within the network in order to determine which RU has the highest signal quality.

Figure 3:
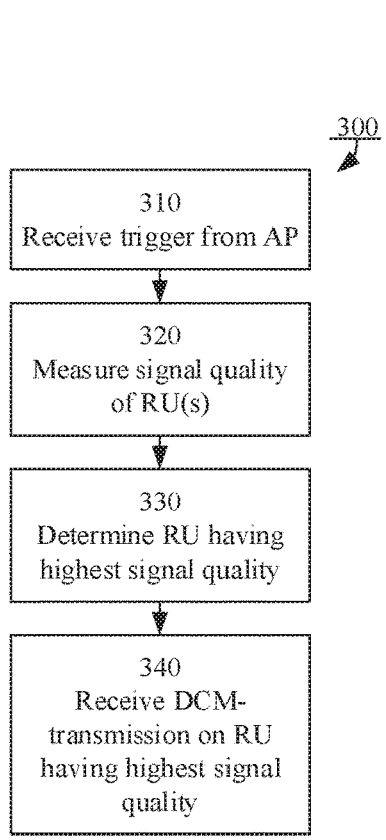
FIG. 3 is a flow chart illustrating an example method according to some embodiments.

FIG. 3 illustrates a method 300 of a wireless terminal according to some embodiments. The wireless terminal operates in a wireless network using at least one wideband channel (e.g. the channel described in FIGS. 1 and/or 2), wherein the wireless terminal is configured to operate in a narrowband channel within the wideband channel. The wireless terminal may e.g. in some embodiments be a narrowband terminal having a LRLP transceiver only capable of reception and transmission on a frequency range corresponding to e.g. a single 26-subcarrier RU (e.g. one of the 26 sub-carrier or the 52 or 106 sub-carrier RUs described in conjunction with FIG. 1.).

The network may comprise at least one other wireless terminal operating in the entire wideband channel (the other terminal may e.g. be capable of reception and transmission on the 242 sub-carrier RU described in conjunction with FIG. 1 and/or be a wideband terminal), and at least one access point—AP.

The AP may support transmission and reception over the entire wideband channel and the wideband channel may be dividable into a plurality of resource units (e.g. the divisions as described in conjunction with FIG. 1).

In some embodiments, the AP may support transmission and reception over all, and/or over a subset of the plurality of resource units.

The method 300 begins in 310 where the narrowband terminal receives a trigger from the AP.

The trigger may comprise an indication of a first resource unit and a second resource unit of the plurality of resource units, on which the AP will transmit data packets intended to the narrowband terminal using a dual carrier mode—DCM—transmission.

The trigger may e.g. be a trigger frame broadcasted over the wideband. The trigger frame may for instance consist of 9 replicas of the same information, transmitted on RU1, RU2, . . . , RU9 (compare with FIG. 2). This allows the narrowband terminal, which is only able to receive one RU, to obtain the information comprised in the trigger.

The method continues in 320 where the narrowband terminal, after having received the trigger indicating the relevant RUs measures a signal quality of the first and second resource units by measuring, in a frequency of the wideband channel which corresponds to the first and second resource units, a reception quality of data transmitted from the AP to the at least one other wireless terminal. The at least one other wireless terminal may e.g. be another narrowband or wideband terminal present in the wireless network.

The transmission to the one or more other terminals in the network will be sent over the entire bandwidth, or over all, and/or over a subset, of the plurality of RUs, which also comprises the frequency corresponding to the indicated RUs where the first and second narrowband terminals may detect and use the transmission for channel measurements, such as measuring a signal quality of the channel.

The narrowband terminal may not be able to receive and unpack data packets intended for another terminal, e.g. another wideband terminal. However, it can use them to estimate the received power and signal quality in the frequencies that corresponds to the indicated RUs by measuring the reception quality, i.e. how well the transmission is received.

In 330 of the method 300, the narrowband terminal may determine which of the first and second resource units has a highest signal quality based on the measured signal quality.

E.g. the narrowband terminal may tune its transceiver to first receive on the first indicated RU and perform signal quality measurements on the traffic being sent there, and then tune the transceiver to receive on the second indicated RU and perform the signal quality measurements there.

The measured signal quality may e.g. be a signal quality measurement such as received power, measurement of received signal strength indication (RSSI), channel attenuation or the like.

When the RU having the highest signal quality has been determined, then in 340 of the method 300, the narrowband terminal sets its transceiver to receive the DCM-transmission on the resource unit determined to have the highest signal quality.

In some embodiments, the first and second resource units are chosen by the AP such that they are not adjacent in frequency. The first and second RUs may e.g. be chosen as described in conjunction with FIG. 2.

In some embodiments, the narrowband terminal may measure the signal quality during a measurement period.

In some embodiments, the trigger may further comprise a transmission time indication indicative of the length of the measurement period.

In some embodiments, in order to further save power, the trigger may further comprise a transmission time indication indicative of a time when the AP will transmit the DCM-transmission. The method 300 may in such case also comprise measuring the quality of the first and second resource units during a time period between receiving the trigger and the time indicated for the DCM-transmission, and listening for and receiving the DCM-transmission at the time indicated by the trigger.

In some embodiments, the measurement period may be the time period between receiving the trigger and the time indicated for the DCM-transmission.

In some embodiments, the trigger may further comprise a transmission time indication indicative of a number of down link (DL) frames to the one or more other wireless terminal following the transmission of the trigger.

In some embodiments, the trigger may always be followed by a predetermined number of DL frames, and the time indication is indicative of the length of the frames.

In some embodiments, the measurement period may be the duration of the number of DL-transmissions following the trigger.

The signal quality measurements of the RUs should only be performed when data is transmitted from the AP and not from any other terminal. The signal quality of the RU may e.g. vary with distance. Other terminals may typically move around within the network, leading to that the measurements performed on transmission from other terminals are not representative of how the signal quality is on the link between the AP and the narrowband terminal.

In order to make sure that the transmission which the narrowband terminal utilizes for quality measurements is really sent from the AP, various strategies are possible.

E.g. in some embodiments, the transmission of the AP may be signaled in a way which is decodable by the narrowband terminal. Additionally or alternatively, in some embodiments, the AP may arrange its transmission such that each trigger frame is followed by a number of down link (DL) transmissions which the narrowband terminal may use for measurements. The number of DL transmission may e.g. be set to be at least one. In some embodiments, the number of DL transmission may e.g. be set to be at least two or more.

Additionally or alternatively, in some embodiments, the trigger may further comprise an indication indicative of a time period during which the AP will transmit DL transmissions not intended to the narrowband terminal, and during which period the narrowband terminal may measure the signal quality of the first and second resource units.

In some embodiments, the DCM transmission may be encoded by the AP using a quadrature phase shift keying—QPSK—signal. The narrowband terminal may receive the data packets in an in-phase component of the QPSK signal, or in a quadrature-phase component of the QPSK signal.

The trigger may comprise an indication informing the narrowband terminal of which phase component the wireless terminal will receive the DCM-transmission in. The method 300 may in such case further comprise that the narrowband terminal receives the DCM-transmission in the indicated phase component on the resource unit determined to have the highest signal quality.

The QPSK signal may e.g. comprise two binary phase shift keying (BPSK) signals encoded in a single QPSK signal which is repeated on the RUs. In such case, information to two narrowband terminals may be transmitted in each RU. This is possible since the information to the first terminals may be transmitted in the in-phase (I-phase) component of the signal, whereas the information to the second terminal may be transmitted in the quadrature-phase (Q-phase) component of the signal, or vice versa.

The AP does not need to be aware of which RU the narrowband terminal decides to receive data on, since the AP will transmit on both RUs using DCM.

In some embodiments, if the narrowband terminal determines that both resource units are of inferior quality, it may refrain from receiving the transmission on either resource unit and instead entering a power saving mode where it may await the reception of a new trigger.

The narrowband terminal may e.g. determine that signal quality of both carriers fail to meet a quality requirement. The quality requirement may e.g. be that RSSI, or signal power should be at least at a minimum value, e.g. not less than 100 dB. Alternatively or additionally, the expected packet error rate for receiving using a specific RU should not exceed 20, 30, 40 or 50 percent. However, other values are of course possible.

Figure 4:
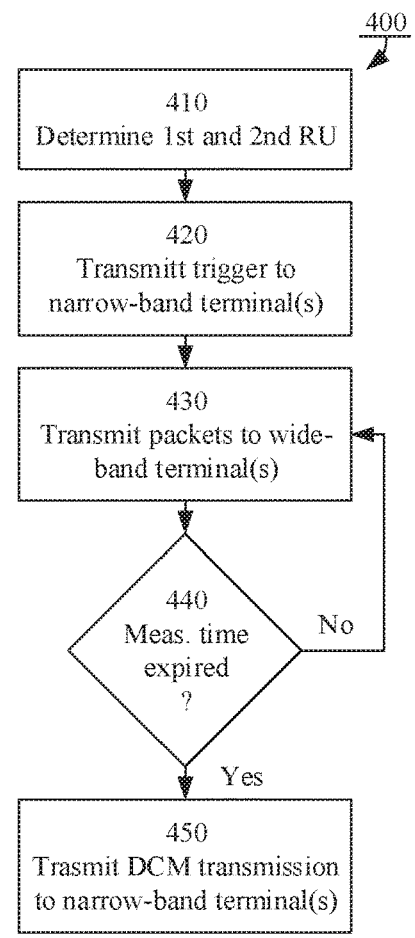
FIG. 4 is a flow chart illustrating an example method according to some embodiments.

FIG. 4 illustrates an example method 400 of an AP (e.g. the AP as described in conjunction with FIG. 3) according to some embodiments.

The AP may operate in a wireless network using at least one wideband channel. The wireless network may comprise at least a first wireless terminal configured to operate in a narrowband channel within the wideband channel, and at least one other wireless terminal configured to operate in the entire wideband channel.

The AP may support transmission and reception over the entire wideband channel. The wideband channel is dividable into a plurality of resource units (e.g. as described in conjunction with FIG. 1).

In some embodiments, the AP may support transmission and reception over all of the plurality of resource units, and/or over a subset of the plurality of resource units.

The first wireless terminal may be a narrowband terminal, e.g. the narrowband terminal (or wireless terminal) as described in conjunction with FIG. 3, and the at least one other wireless terminal may be a wideband terminal e.g. the wideband terminal (or other wireless terminal) as described in conjunction with FIG. 3.

The method 400 begins in 410 where the AP determines a first and a second resource unit of the plurality of resource units to be used for transmitting data (e.g. data packets) to the first narrowband terminal using a dual carrier modulation—DCM—transmission.

The method continues in 420 where the AP transmits a trigger to the first narrowband terminal.

The trigger may comprise an indication of a first resource unit and a second resource unit of the plurality of resource units, on which the AP will transmit data intended to the narrowband terminal using a dual carrier modulation—DCM—transmission.

The trigger may e.g. be a trigger frame broadcasted over the wideband. The trigger frame may for instance consist of nine replicas of the same information, transmitted on RU1, RU2, . . . , RU9 (compare with FIG. 2). This allows the narrowband terminal which is only able to receive one RU to obtain the information comprised in the trigger.

The method 400 continues in 430, where the AP transmits data to the at least one other wireless terminal during a measurement period. The data is transmitted in a frequency of the wideband channel which includes the first and second resource units and is suitable for measurements, by the first narrowband terminal, of a signal quality of the first and second resource units (compare with step 320 of method 300).

E.g. when the AP transmits data to the at least one other wireless terminal, it may transmit data over all, or over a subset of the RUs. Thus, the data is also transmitted in a frequency including the first and second RUs (as they are included in all, or may be included within a subset of the plurality of RUs) indicated in the trigger, and the wireless terminal may use the transmission for performing signal quality measurements of the first and second RUs.

In 440 the AP determines whether the measurement period has expired, and if so (Yes-path out of 440), it transmits the data intended to the first narrowband terminal on the first and the second resource units using DCM-transmission.

If in 440 the AP determines that the measurement period has not expired (No-path out of 440), then it keeps on transmitting to the at least one other terminal.

In some embodiments, the measurement period corresponds to a time passing between the transmission of the trigger and the DCM transmission. The trigger may in some embodiments further comprise a transmission time indication indicative of the time when the AP will transmit the DCM-transmission. This also has a benefit since it helps the narrowband terminal to save power.

In some embodiments, the transmission time indication may be indicative of a length of the measurement period.

In some embodiments, the measurement period may correspond to the time between transmitting the trigger and the time indicated for transmitting the DCM-transmission.

In some embodiments, the measurement period may correspond to the length of a predetermined number of DL-frames (or transmissions) transmitted after the trigger from the AP to the at least one other wireless terminal.

The predetermined number of DL-frames may be determined by the AP. The number may e.g. vary based on network parameters such as network topology, RSSI, congestion, network traffic, signal strength etc.

In some embodiments, the number of DL-frames may be only one.

In some embodiments, the number of DL-frames may be two or more.

The signal quality measurements of the RUs should only be performed when data is transmitted from the AP and not from any other terminal. The signal quality of the RU may e.g. vary with distance. Other terminals may typically move around within the network, leading to that the measurements performed on transmission from other terminals are not representative of how the signal quality is on the link between the AP and the narrowband terminal.

In order to make sure that the transmissions to the narrowband terminal utilized for signal quality measurements is really sent from the AP, various strategies are possible.

E.g. in some embodiments, the transmission of the AP may be signaled in a way which is decodable by the narrowband terminal. Additionally or alternatively, in some embodiments, the AP may arrange its transmission such that each trigger frame is followed by a number of downlink (DL) transmissions (or frames) which the narrowband terminal may use for measurements. The number of DL transmissions may e.g. be set to be at only one. In some embodiments, the number of DL transmissions may e.g. be set to be at least two or more.

Additionally or alternatively, in some embodiments, the trigger may further comprise an indication indicative of a time period (e.g. the measurement period described in 440 of method 400) during which the AP will transmit DL transmissions not intended to the narrowband terminal, and during which period the narrowband terminal may measure the signal quality of the first and second resource units.

In some embodiments, the plurality of resource units may comprise at least one of 26 sub-carriers, 52 sub-carriers and 106 sub-carriers (compare with FIG. 1).

In some embodiments, the AP may determine the first and the second resource unit such that they are not adjacent in frequency (compare with FIG. 2).

In some embodiments, the method 400 may further comprise transmitting the trigger to a second wireless terminal operating in the narrowband within the wideband channel. The second wireless terminal may e.g. be a second narrowband terminal (e.g. a narrowband terminal such as described in conjunction with FIG. 3).

The trigger may indicate that the first and the second narrowband terminals will receive the DCM transmission on the first and the second resource units.

In order to optimally utilize the bandwidth and make it possible for two terminals to receive DL transmissions on the same resource units, the AP may encode the DCM transmission using a quadrature phase shift keying—QPSK—signal. The first narrowband terminal may receive the data packets in an in-phase component of the QPSK signal, and the second narrowband terminal may receive the data packets in a quadrature-phase component of the QPSK signal, or vice versa.

In some embodiments, the DCM transmission may be encoded using 16-QAM (16-Quadrature Amplitude Modulation).

The 16-QAM may comprise two 4-level amplitude modulated signals encoded in a single 16-QAM signal which is repeated on two RUs.

If this type of modulation is used for transmitting to two terminals, then the information to first terminal may be transmitted using a 4-level amplitude modulation in the I-phase component of the signal, whereas the information to the second terminal may be transmitted using a 4-level amplitude modulation in the Q-phase component of the signal, or vice versa.

Furthermore, if 16 QAM is used, and the second terminal is located far from the first terminal, then in some embodiments, the AP may predict that the 4-level amplitude is not reliable for the transmission to the second terminal. The AP may in such case determine to use a 2-level amplitude modulation in the Q-component of the signal. In some embodiments, the AP may still keep the 4-level amplitude modulation in the I-phase component of the signal.

The decision to use either of the above described modulation types, or any other suitable modulation type may be based on various network parameters. Such parameters may e.g. be network traffic, network topology, geography, signal strength etc.

If e.g. both of the first and second terminals are located far from the AP, the AP may decide to use a 2-level amplitude modulation for both terminals.

In some embodiments, the trigger may further comprise an indication informing the first and second narrowband terminals of which phase component the respective terminal will receive the DCM-transmission in.

In some embodiments, the trigger may further comprise an indication informing the first and second narrowband terminal of which type of modulation the DCM-transmission will be encoded with.

Figure 5:
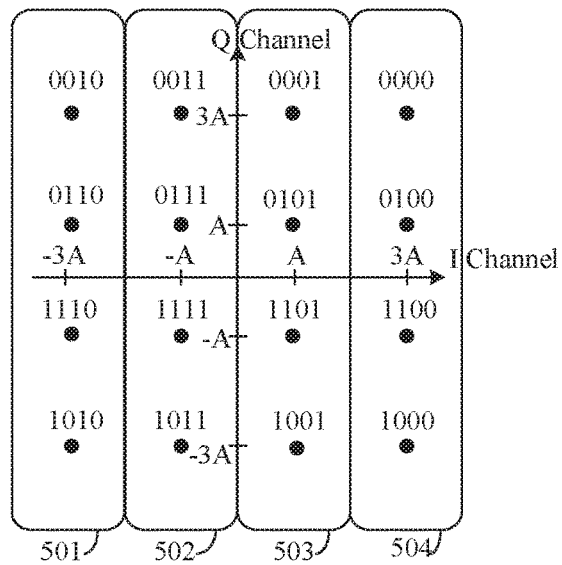
FIG. 5 is a schematic drawing illustrating an example modulation according to some embodiments.

FIG. 5 illustrates the decision regions for 4-level amplitude modulation in the I-phase region.

A narrowband terminal receiving information in the I-phase component of the signal receives the information in the two last bits of each symbol (symbols 0000-1111 in FIG. 5). The narrowband terminal only has to determine in what region (501, 502, 503, 504) the signal is present in order to filter out the data which is intended for it.

Figure 6:
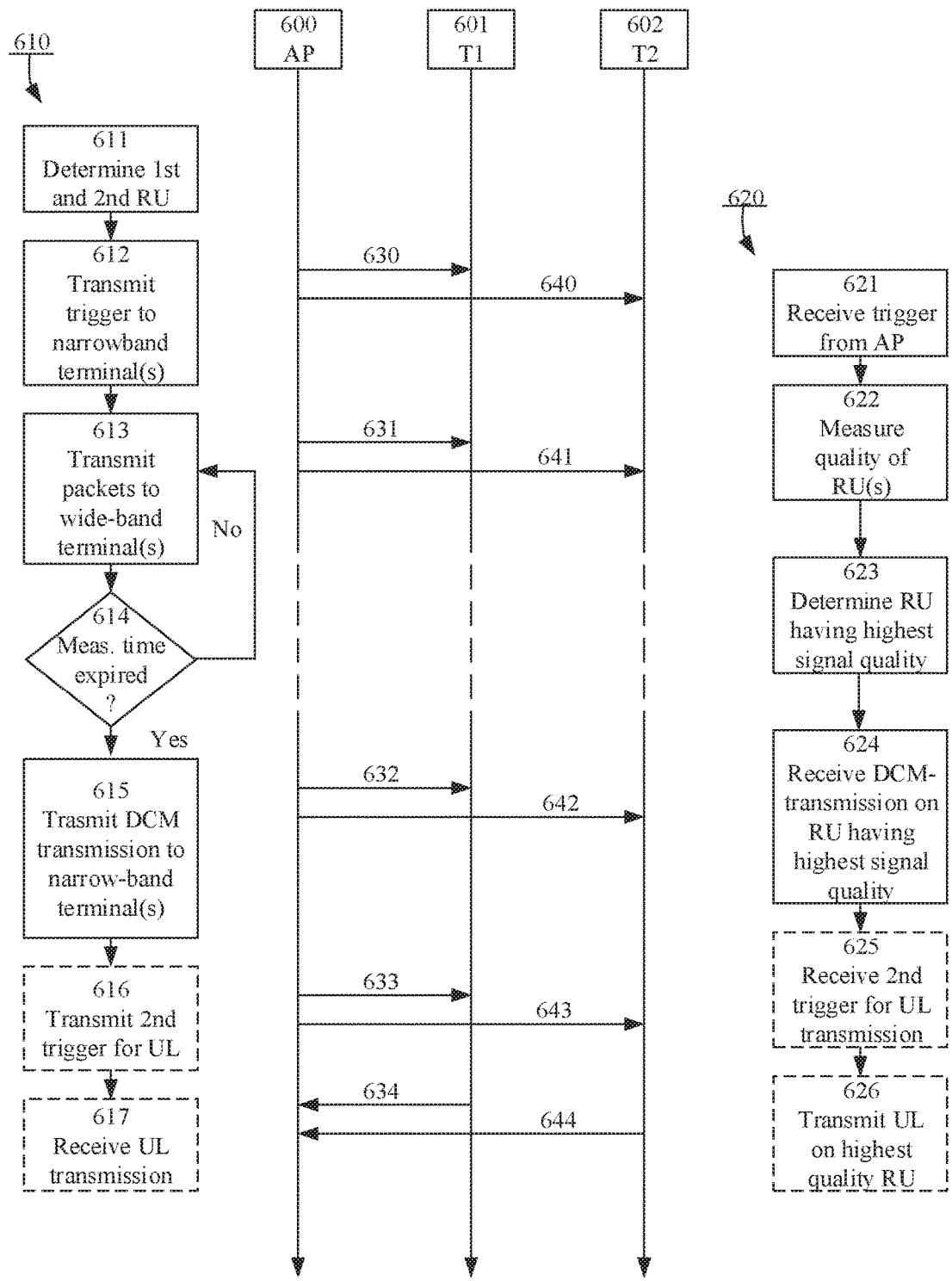
FIG. 6 is a combined flow chart and signaling diagram illustrating an example method and corresponding/related signaling according to some embodiments.

FIG. 6 illustrates a combined flowchart and signaling diagram according to some embodiments. In FIG. 6, an AP 600 (e.g. the AP described in conjunction with any of the FIGS. 3 and/or 4), carries out the method 610 (the method 610 may e.g. comprise the same method steps and features as described in conjunction with the method 400 in FIG. 4). A first terminal 601 (e.g. the narrowband, or wireless, terminal as described in conjunction with FIG. 3, and or the first terminal as described in conjunction with FIG. 4) and a second terminal 602 (e.g. the narrowband, or wireless, terminal as described in conjunction with FIG. 3, and or the second terminal as described in conjunction with FIG. 4) carry out the method 620 (the method 620 may e.g. comprise the same method steps and features as described in conjunction with FIG. 3).

The AP 600, first narrowband terminal 601 and second narrowband terminal 602 operates in a wireless network which may comprise one or more other terminals (e.g. the at least one other terminal, or wideband terminal as described in conjunction with any of the FIGS. 3-4, or in some embodiments, the one or more other terminals is another narrowband terminal).

In 611 the AP 600 determines a first and a second resource unit of a plurality of resource units (compare to FIGS. 1 and 2) to be used for transmitting data packets to the first narrowband terminal using a dual carrier modulation—DCM—transmission.

In 612 the AP 600 transmits a trigger to the first narrowband terminal 601 and to the second narrowband terminal 602 as indicated by transmission arrows 630 and 640. The trigger may comprise an indication of the first resource unit and the second resource unit on which the AP will transmit data intended to the first and second narrowband terminals 601, 602.

In 621, the first and second narrowband terminals 601, 602 receive the trigger from the AP 600.

The first and second narrowband terminals now possess an indication as to when the DCM-transmission will be received, and can in 622 of method 620 start measuring the signal quality of the first and second RUs.

In order for the first and second narrowband terminals 601, 602 to be able to determine the quality of the indicated first and second RUs, the AP starts in 612 to transmit data intended to the at least one other terminal in the network, by e.g. transmitting data over all, or over a subset of the plurality of RUs including the first and second RUs.

The transmission to the one or more other wideband terminals in the network may be sent over the entire bandwidth, i.e. over all of the plurality of RUs, which also comprises the frequency corresponding to the indicated RUs where the first and second narrowband terminals may detect and use the transmission for performing signal quality measurements of the channel, as indicated by transmission arrows 631, 641.

The first and second narrowband terminals may not be able to receive and unpack data packets intended for other terminals. However, they can use them to estimate the received power and signal quality in the frequencies that corresponds to the indicated first and second RUs by e.g. measuring the RSSI or signal power.

Thus, the first and second narrowband terminals 601, 602 can monitor the signal quality of the indicated RUs by e.g. measuring the received power of the transmissions to the one or more other terminals.

The signal quality measurements of the RUs should only be performed when data is transmitted from the AP and not from any other terminal. The signal quality of the RU may e.g. vary with distance. Other terminals may typically move around within the network, leading to that the measurements performed on transmission from other terminals are not representative of how the signal quality is on the link between the AP and the narrowband terminal.

In order to make sure that the transmission which the narrowband terminals utilize for signal quality measurements is really sent from the AP, various strategies are possible.

E.g. in some embodiments, the transmission of the AP may be signaled in a way which is decodable by the narrowband terminal. Additionally or alternatively, in some embodiments, the AP may arrange its transmission such that each trigger frame is followed by a number of down link (DL) transmission (or frames) which the narrowband terminal may use for measurements. The number of DL transmissions may e.g. be set to be only one. In some embodiments, the number of DL transmissions may e.g. be set to be at least two or more.

Additionally or alternatively, in some embodiments, the trigger may further comprise an indication indicative of a time period during which the AP will transmit DL transmissions not intended to the narrowband terminal, and during which period the narrowband terminal may measure the quality of the first and second resource unit.

While the first and second narrowband terminal measures the signal quality of the indicated RUs, the AP checks in 614 of method 610 if a measurement period has expired. The measurement period may e.g. be determined as described in conjunction with any of the FIGS. 3 and 4, and in the above described embodiments (e.g. a time period during which the AP will transmit DL-transmission to other terminals, a time needed for sending a determined number of DL-transmissions, etc).

In some embodiments, the measurement period may be a time period between sending the trigger to the first and second narrowband terminals, and transmitting the DCM-transmission to the first and second narrowband terminals.

If in 614 of method 610, the AP determines that the measurement period has not expired (No-path out of 614), the method 610 continues in 613, where the AP transmits further data to the one or more other wideband terminal in the network.

Prior to the expiration of the measurement period, the first and second narrowband terminals may in 623 of the method 620 determine which of the indicated RUs have the signal highest quality, and set their transceivers to receive on the RU determined to have the highest quality.

In 614 of the method 610, if the AP determines that the measurement time has expired (Yes-path out of 614) the method 610 continues in 615 where the AP transmits the DCM-transmission on both indicated RUs to the first and second narrowband terminals, as indicated by transmission arrows 632, and 642.

In 624 of the method 620, the first and second narrowband terminals receive the DCM transmission on the RU determined to have the highest signal quality.

In some embodiments, the method 610 and 620 may continue for an uplink (UL) transmission scenario (as indicated by the dashed boxes of method steps 616-617 and 625-626).

The method 610 continues in 616 where the AP transmits a second trigger to the first and second narrowband terminals (as indicated by transmission arrows 633 and 643).

The second trigger from the AP may indicate whether the first and second narrowband terminals are allowed to transmit data in an upcoming uplink slot.

In 625 of the method 620, the first and second narrowband terminals receive the second trigger, and determine which RU should be used for transmitting UL-transmission to the AP.

The second trigger may further comprise an indication indicative of which RUs the first and second narrowband terminals may use for UL transmission. The indicated RUs in the second trigger should preferably coincide with the indicated RU in the first trigger as this allows the narrowband transmitters to select a RU with a known quality.

If this is the case, the method further comprises transmitting the data in the uplink slot to the AP on the resource unit determined to have the highest signal quality. If, other RUs would be allocated by the second trigger, the narrowband transmitter may select one of the RUs arbitrarily or possibly based on some partial knowledge obtained at an earlier point in time.

In 626 of the method 620, the first and second narrowband terminals transmit the UL-transmission to the AP on the determined RU (as indicated by transmission arrows 644, 634).

Since the AP is not aware of which RU the narrowband terminal will use for its UL transmission, the AP may prepare for receiving UL transmission on the RUs used for DCM in the DL-transmission to the first and second narrowband terminals.

In 617, the AP receives the UL-transmission from the first and second narrowband terminals on either of the indicated first and second RUs.

The AP does not need to be aware of which RU the narrowband terminal decides to receive data on, since the AP will transmit on both RU using DCM.

As consequence, the narrowband terminal may, in some embodiments, itself determine which of the RUs it will use for uplink (UL) transmission to the AP.

Figure 7:
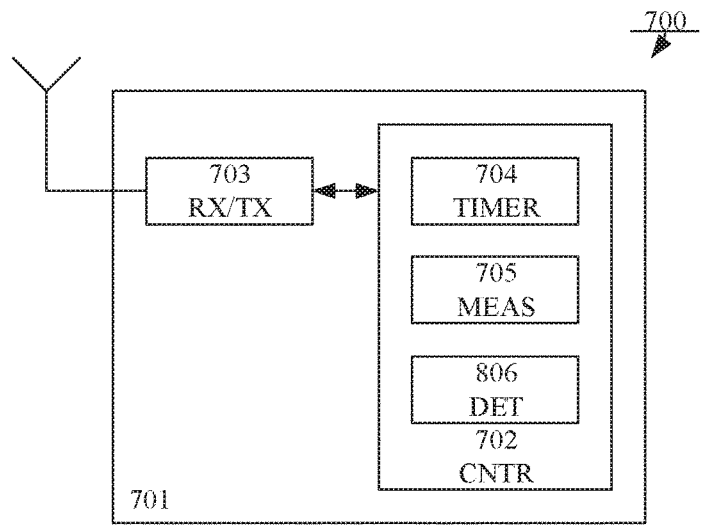
FIG. 7 is a block diagram illustrating an example arrangement according to some embodiments.

FIG. 7 illustrates an example arrangement 700 of a wireless terminal 701 configured to operate in a wireless network using at least one wideband channel, wherein the wireless terminal is configured to operate in a narrowband channel within the wideband channel.

The network comprises at least one other wireless terminal configured to operate in the entire wideband channel, and at least one access point—AP (the AP may e.g. be the AP as described in conjunction with any of the FIGS. 3, 4, and 6). The AP is configured to support transmission and reception over the entire wideband channel, wherein the wideband channel is dividable into a plurality of resource units (as described in FIG. 1).

The arrangement 700 may e.g. be of the wireless terminal and/or first and second terminal as described in conjunction any of the FIGS. 3-6. The wireless terminal may e.g. be a narrowband terminal (as described in FIGS. 3-6).

The arrangement 700 of the wireless terminal 701 may also be configured to carry out the method according to any of the FIGS. 3 and 6.

The arrangement 700 comprises a transceiver 703 (RX/TX) and a controller 702 (CNTR). In some embodiments, the transceiver 703 is a separate receiver and a separate transmitter.

In some embodiments, the controller 702 may further comprise a timer 704 (TIMER), a measurement unit 705 (MEAS) and a determiner 706 (DET).

The controller 702 may in some embodiments be configured to cause the transceiver 703 to receive a trigger from the AP (compare with step 310 and 621 of method 300 and 620), wherein the trigger comprises an indication of a first resource unit and a second resource unit of the plurality of resource units on which the AP will transmit data packets intended to the narrowband terminal using a dual carrier modulation—DCM—transmission.

After having received the trigger, the controller may further cause the transceiver 703 to set reception on the first indicated RU and then tune in on the second indicated RU and further cause the measurement unit 705 to measure a quality of the first and second resource units by measuring, in a frequency of the wideband channel corresponding to the first and second resource unit, a reception quality of data transmitted from the AP to the at least one other wideband terminal (compare with step 320 and 622 of method 300 and 620).

E.g. the AP may transmit data for the at least one other wireless terminal over all of the plurality of RUs which also includes the frequency corresponding the first and second RUs. The Ap may also transmit data over a subset of the plurality of resource units, which subset may include the frequency corresponding to the first and second RUs.

The signal quality measurements are not performed on the first and second RUs simultaneously. Thus, the controller 702 may further set the timer to set a first time period during which the transceiver is tuned to the first RU and signal quality measurements are performed on the first RU, and a second time period during which the transceiver is tuned to the second RU and signal quality measurements are performed on the second RU.

The measured signal quality may e.g. be a signal quality measurement such as received power, or measurement of received signal strength indication (RSSI) or similar quality indicating parameters.

When signal quality measurements have been performed on each indicated RU, the controller 705 is further configured to cause the determiner 706 to determine which of the first and second resource units has a highest signal quality based on the measured quality.

When it has been determined which of the first and second RU has the highest signal quality, the controller 702 further causes the transceiver 703 to set reception on, and to receive the DCM-transmission on the resource unit determined to have the highest signal quality.

In some embodiments, the trigger further comprises a transmission time indication indicative of a time when the AP will transmit the DCM-transmission. The controller 702 may be further configured to cause the timer 704 set the first and second measurement periods such that the) sum up equal a time period between reception of the trigger and the time indicated for the DCM-transmission.

The controller 702 may further be configured to cause the transceiver 703 to listen for and receive the DCM-transmission at the time indicated by the trigger.

The time periods set by the timer 704 may in some embodiments be determined as described in conjunction with any of the FIGS. 3, 4 and/or 6.

In some embodiments, the controller 702 is further configured to cause the reception of a second trigger frame from the AP indicating whether the narrowband terminal is allowed to transmit data in a coming uplink slot, and to cause the transmission of the data in the uplink slot to the AP on the resource unit having the highest signal quality (compare with method steps 625 and 626 of method 620).

It should also be noted that the term arrangement is to be interpreted in this disclosure as an aggregation of features making up a system or an apparatus. The term can therefore be used interchangeably with the terms system or apparatus.

Figure 8:
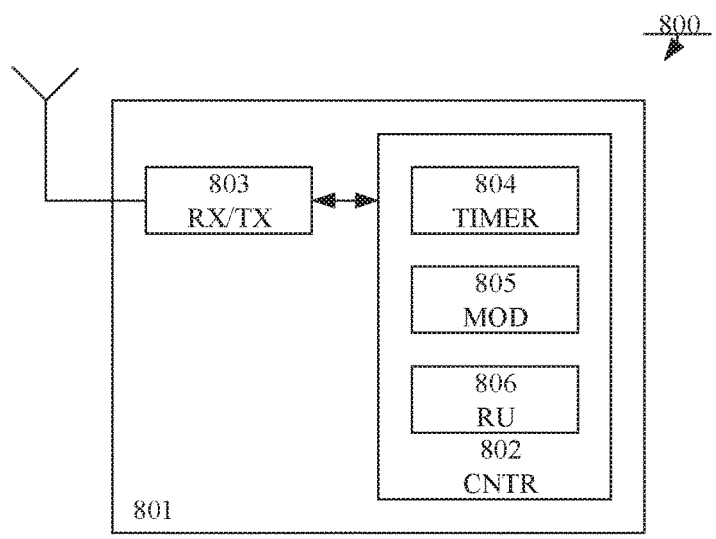
FIG. 8 is a block diagram illustrating an example arrangement according to some embodiments.

FIG. 8 illustrates an example arrangement 800 of an access point—AP—801 configured to operate in a wireless network using at least one wideband channel, wherein the wireless network comprises at least a first wireless terminal (e.g. the wireless terminal or the first and second terminal or narrowband terminal as described in conjunction with any of the FIGS. 3-7) configured to operate in a narrowband channel within the wideband channel, and at least one other wireless terminal (e.g. the other wireless terminal or wideband terminal as described in conjunction with any of the FIGS. 3-7) configured to operate in the entire wideband channel. The AP 801 is configured to support transmission and reception over the entire wideband channel. The wideband channel is furthermore dividable into a plurality of resource units (e.g. as described in conjunction with FIG. 1).

In some embodiments, the AP is configured to support transmission and reception over all of the plurality of RUs.

The AP 801 comprising the arrangement 800 may e.g. be any of the APs as described in conjunction with any of the FIGS. 3-7.

The arrangement 800 may further be configured to carry out the method 400 and 610 as described in conjunction with FIGS. 4 and 6.

The arrangement 800 comprises a transceiver 803 (RX/TX) and a controller 802 (CNTR).

In some embodiments, the transceiver 803 is a separate receiver and a separate transmitter.

In some embodiments, the controller 802 may further comprise a timer 804 (TIMER), a modulating unit 805 (MOD) and a resource unit determiner 806 (RU).

The controller 802 may in some embodiments be further configured to cause the resource unit determiner 806 to determine a first and a second resource unit of the plurality of resource units to be used for transmitting data to the first narrowband terminal using a dual carrier modulation—DCM—transmission.

The controller 802 may in some embodiments be configured to cause the transceiver 803 to transmit a trigger to the first narrowband terminal, wherein the trigger comprises an indication of the first resource unit and the second resource unit on which the AP 801 will transmit data intended to the first narrowband terminal.

The controller 802 may further be configured to cause the transceiver 803 to transmit data to the at least one other wideband terminal during a measurement period. The data is transmitted in a frequency of the wideband channel which includes the first and second resource units and is suitable for measurements, by the first narrowband terminal, of a signal quality of the first and second resource units.

E.g. the controller may cause transmission to the at least one other wireless terminal over all of the plurality of RUs, which also includes the frequency of the first and second RUs. The controller may also cause transmission to the at least one other wireless terminal over a subset of the plurality of RUs, which subset may include the frequency of the first and second RUs.

The signal quality of the first and second resource units may be determined e.g. as described in conjunction with any of the FIGS. 3, 4, 6 and 7.

In some embodiments the controller 802 may further be configured to set the timer 804 to set a time for the measurement period, during which time the AP 801 may transmit data to the at least one other wideband terminals in the network.

The controller 802 may further be configured to cause the timer 804 to determine whether the measurement period has expired, and if so, the controller 802 is configured to cause the transceiver 803 to transmit the data intended to the first narrowband terminal on the first and the second resource units using DCM-transmission.

In some embodiments, the measurement period corresponds to a time passing between the transmission of the trigger and the DCM transmission. The trigger may in such case further comprise a transmission time indication indicative of the time when the AP will transmit the DCM-transmission. This also has a benefit as it helps the narrowband terminal to save power, since the narrowband terminal may tune on the RU when it is time to receive the transmission and stay in a sleep mode or idle mode until then (after having finished the signal quality measurements).

The quality measurements of the RUs should only be performed when data is transmitted from the AP and not from any other terminal. The signal quality of the RU may e.g. vary with distance. Other terminals may typically move around within the network, leading to that the measurements performed on transmission from other terminals are not representative of how the signal quality is on the link between the AP and the narrowband terminal.

In order to make sure that the transmission which the narrowband terminals utilize for quality measurements is really sent from the AP, various strategies are possible.

E.g. in some embodiments, the transmission of the AP may be signaled in a way which is decodable by the narrowband terminal. Additionally or alternatively, in some embodiments, the AP may arrange its transmission such that each trigger frame is followed by a number of down link (DL) transmissions which the narrowband terminal may use for measurements. The number of DL transmissions may e.g. be set to be at only one. In some embodiments, the number of DL transmissions may e.g. be set to be at least two or more.

Additionally or alternatively, in some embodiments, the trigger may further comprise an indication indicative of a time period (e.g. the measurement period(s) described in conjunction with any of the FIG. 3-7) during which the AP will transmit DL transmissions not intended to the narrowband terminal, and during which time period the narrowband terminal may measure the signal quality of the first and second resource units.

In some embodiments, the controller 802 may be further configured to divide the plurality of resource units into at least one of 26 sub-carriers, 52 sub-carriers and 106 sub-carriers (compare with FIG. 1).

In some embodiments, the controller 802 is further configured to cause the resource unit determiner 806 to determine the first and the second resource unit such that they are not adjacent in frequency, for example, such as described in conjunction with any of the FIGS. 2 and 4.

In some embodiments, the controller 802 is configured to cause the transceiver to transit the trigger to a second wireless terminal (e.g. the wireless terminal, first terminal, second terminal or narrowband terminal as described in FIGS. 3-7) configured to operate in the narrowband channel within the wideband channel, and wherein the trigger further indicates that the first and the second narrowband terminals will receive the DCM-transmission on the first and the second resource units.

In some embodiments, the controller 802 is further configured to cause modulating unit 805 to encode the DCM transmission using a quadrature phase shift keying—QPSK—signal. The controller 802 may further be configured to cause the transceiver 803 to transmit the DCM-transmission to the first narrowband terminal in an in-phase component of the QPSK signal, and the transmission of the DCM-transmission to the second narrowband terminal in a quadrature-phase component of the QPSK signal, or vice versa.

In some embodiments, the DCM transmission may be encoded using 16-QAM (16-Quadrature Amplitude Modulation). The 16-QAM may comprise two 4-level amplitude modulated signals encoded in a single 16-QAM signal which is repeated on two RUs.

If this type of modulation is used for transmitting to two terminals, then the information to first narrowband terminal may be transmitted using a 4-level amplitude modulation in the I-phase component of the signal, whereas the information to the second narrowband terminal may be transmitted using a 4-level amplitude modulation in the Q-phase component of the signal, or vice versa.

Furthermore, if 16-QAM is used, and the second narrowband terminal is located far from the first narrowband terminal or vice versa, then in some embodiments, the AP may predict that the 4-level amplitude is not reliable for the transmission to the second terminal. The controller 802 may in such case cause the modulation unit 806 to determine to use a 2-level amplitude modulation in the Q-component of the signal.

In some embodiments, the AP may still keep the 4-level amplitude modulation in the I-phase component of the signal.

The decision to use either of the above described modulation types, or any other suitable modulation type may be based on various network parameters. Such parameters may e.g. be network traffic, network topology, geography, signal strength etc.

E.g. if both the first and second narrowband terminals are located far from the AP, the AP may decide to use a 2-level amplitude modulation for both terminals.

In some embodiments, the trigger may further comprise an indication informing the first and second narrowband terminal of which phase component the respective terminal will receive the DCM-transmission on.

Figure 9:
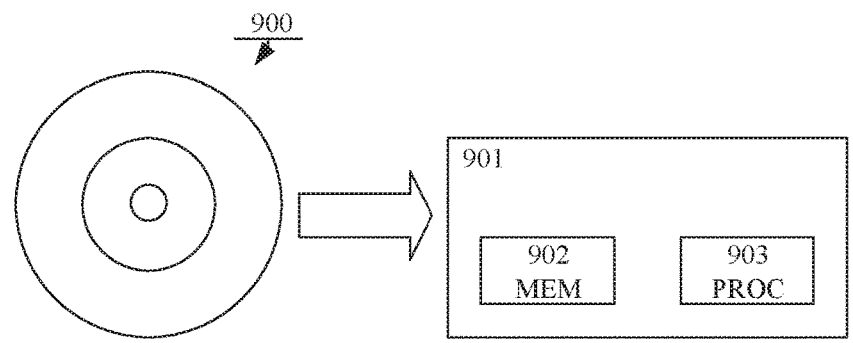
FIG. 9 is a block diagram illustrating a computer program product according to some embodiments.

FIG. 9 illustrates a computer program product 900 comprising a computer readable medium, having thereon a computer program comprising program instructions. The computer program may be loadable into a data-processing unit 901 comprising a memory 902 (MEM) and a processor 903 (PROC) and configured to store and to cause execution of the methods according to any of the FIGS. 3, 4 and 6 when the computer program is run by the data-processing unit.

According to some embodiments, the computer program product 900 comprises a computer readable medium such as, for example, a diskette or a CD-ROM. The computer readable medium may have stored thereon a computer program comprising program instructions. The data-processing unit 901, may, for example, be comprised in the any of the wireless terminals or AP as described in conjunction with any of the FIGS. 3, 4, 6, 7 and 8. When loaded into the data-processing unit 901, the computer program may be stored in the memory 902 associated with or integral to the data-processing unit 901.

The embodiments herein enable for a wireless network where robust communication with low performance loss, especially in a wireless network comprising terminals having a single carrier transceiver (narrowband transceiver) and terminals having a dual carrier transceiver (wideband transceiver) operating in the same bandwidth.

The DCM-transmission may thus be advantageously utilized even if a terminal can only receive and transmit on one carrier. Furthermore, the AP does not need to receive any message form the wireless terminal indicating which resource unit it should transmit on, which leads to that signal overhead and risk of congestions is low.

The embodiments further enables the utilization of and development of terminals having an inexpensive and power efficient implementation in various and mixed wireless network environments, since they may still benefit from DCM-transmissions. This results in that narrowband terminals and wideband terminals can operate concurrently on the same bandwidth without affecting over all network performance.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a wireless communication terminal or device) comprising circuitry/logic or performing methods according to any of the embodiments. The electronic apparatus may, for example, be a portable or handheld mobile radio communication equipment, a mobile radio terminal, a mobile telephone, a base station, a base station controller, a pager, a communicator, an electronic organizer, a smartphone, a computer, a notebook, a USB-stick, a plug-in card, an embedded drive, or a mobile gaming device.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The invention claimed is:

1. A method of operating a wireless terminal configured to operate in a wireless network using at least one wideband channel, wherein the wireless terminal is configured to operate in a narrowband channel within the wideband channel, wherein the network comprises at least one other wireless terminal configured to operate in the entire wideband channel, and at least one access point (AP), wherein the AP is configured to support transmission and reception over the entire wideband channel, and wherein the wideband channel is dividable into a plurality of resource units, the method comprising:
    receiving a trigger from the AP, wherein the trigger comprises an indication of a first resource unit and a second resource unit of the plurality of resource units on which the AP will transmit data intended to the wireless terminal using a dual carrier modulation (DCM) transmission;
    measuring a signal quality of the first and second resource units by measuring, in a frequency of the wideband channel which corresponds to the first and second resource unit, a reception quality of data transmitted from the AP to the at least one other wireless terminal;
    determining which of the first and second resource units has a highest signal quality based on the measured signal quality;
    receiving the DCM-transmission on the resource unit determined to have the highest signal quality.

2. The method of claim 1, wherein the plurality of resource units comprises either 26, or 52, or 106 sub-carriers.

3. The method of claim 1, wherein the first and the second resource units are not adjacent in frequency.

4. The method of claim 1:
wherein the trigger further comprises a transmission time indication indicative of a time when the AP will transmit the DCM-transmission;
further comprising measuring the signal quality of the first and second resource units during a time period between receiving the trigger and the time indicated for the DCM-transmission; and
further comprising listening for and receiving the DCM-transmission at the time indicated by the trigger.

5. The method of claim 1:
wherein the DCM-transmission is encoded by the AP using a quadrature phase shift keying (QPSK) signal;
wherein the wireless terminal receives the DCM-transmission in an in-phase component of the QPSK signal, or in a quadrature-phase component of the QPSK signal;
wherein the trigger further comprises an indication informing the wireless terminal of which phase component the wireless terminal will receive the DCM-transmission in;
further comprising receiving the DCM-transmission in the indicated phase component on the resource unit determined to have the highest signal quality.

6. The method of claim 1, further comprising:
receiving a second trigger frame from the AP indicating whether the wireless terminal is allowed to transmit data in an upcoming uplink slot; and
transmitting the data in the uplink slot to the AP on the resource unit determined to have the highest signal quality.

7. A method of operating an access point (AP) configured to operate in a wireless network using at least one wideband channel, wherein the wireless network comprises at least a first wireless terminal configured to operate in a narrowband channel within the wideband channel, and at least one other wireless terminal configured to operate in the entire wideband channel, wherein the AP supports transmission and reception over the entire wideband channel, and wherein the wideband channel is dividable into a plurality of resource units, the method comprising:
determining a first and a second resource unit of the plurality of resource units to be used for transmitting data to the first wireless terminal using a dual carrier modulation (DCM) transmission;
transmitting a trigger to the first wireless terminal, wherein the trigger comprises an indication of the first resource unit and the second resource unit on which the AP will transmit data intended to the first wireless terminal;
transmitting data to the at least one other wireless terminal during a measurement period, wherein the data is transmitted in a frequency of the wideband channel, which includes the first and second resource units, and is suitable for measurement, by the first wireless terminal, of a signal quality of the first and second resource units;
determining whether the measurement period has expired, and if so, transmitting data intended to the first wireless terminal on the first and the second resource units using DCM-transmission.

8. The method of claim 7, wherein the plurality of resource units may comprises 26, or 52, or 106 sub-carriers.

9. The method of claim 7, wherein the AP determines the first and the second resource units such that they are not adjacent in frequency.

10. The method of claim 7, wherein the trigger further comprises a transmission time indication indicative of a time when the AP will transmit the DCM-transmission on the indicated first and second resource units.

11. The method of claim 7, wherein:
the trigger is transmitted to a second wireless terminal operating in the narrowband channel within the wideband channel; and
the trigger indicates that the first and the second wireless terminals will receive the DCM-transmission on the first and the second resource units.

12. The method of claim 11, wherein:
the DCM-transmission is encoded using a quadrature phase shift keying (QPSK) signal
wherein the first wireless terminal receives the DCM-transmission in an in-phase component of the QPSK signal and the second wireless terminal receives the DCM-transmission in a quadrature-phase component of the QPSK signal, or vice versa.

13. The method of claim 12, wherein the trigger further comprises an indication informing the first and second wireless terminals of which phase component the respective wireless terminal will receive the DCM-transmission on.

14. A computer program product stored in a non-transitory computer readable medium for controlling operation of a wireless terminal configured to operate in a wireless network using at least one wideband channel, wherein the wireless terminal is configured to operate in a narrowband channel within the wideband channel, wherein the network comprises at least one other wireless terminal configured to operate in the entire wideband channel, and at least one access point (AP), wherein the AP is configured to support transmission and reception over the entire wideband channel, and wherein the wideband channel is dividable into a plurality of resource units, the computer program product comprising software instructions which, when run on a processor of the wireless terminal, causes the wireless terminal to:
receive a trigger from the AP, wherein the trigger comprises an indication of a first resource unit and a second resource unit of the plurality of resource units on which the AP will transmit data intended to the wireless terminal using a dual carrier modulation (DCM) transmission;
measure a signal quality of the first and second resource units by measuring, in a frequency of the wideband channel which corresponds to the first and second resource unit, a reception quality of data transmitted from the AP to the at least one other wireless terminal;
determine which of the first and second resource units has a highest signal quality based on the measured signal quality;
receive the DCM-transmission on the resource unit determined to have the highest signal quality.

15. A computer program product stored in a non-transitory computer readable medium for controlling operation of an access point (AP) configured to operate in a wireless network using at least one wideband channel, wherein the wireless network comprises at least a first wireless terminal configured to operate in a narrowband channel within the wideband channel, and at least one other wireless terminal configured to operate in the entire wideband channel, wherein the AP supports transmission and reception over the entire wideband channel, and wherein the wideband channel is dividable into a plurality of resource units, the computer program product comprising software instructions which, when run on a processor of the AP, causes the AP to:

determine a first and a second resource unit of the plurality of resource units to be used for transmitting data to the first wireless terminal using a dual carrier modulation (DCM) transmission;

transmit a trigger to the first wireless terminal, wherein the trigger comprises an indication of the first resource unit and the second resource unit on which the AP will transmit data intended to the first wireless terminal;

transmit data to the at least one other wireless terminal during a measurement period, wherein the data is transmitted in a frequency of the wideband channel, which includes the first and second resource units, and is suitable for measurement, by the first wireless terminal, of a signal quality of the first and second resource units;

determine whether the measurement period has expired, and if so, transmitting data intended to the first wireless terminal on the first and the second resource units using DCM-transmission.

16. A wireless terminal configured to operate in a wireless network using at least one wideband channel, wherein the wireless terminal is configured to operate in a narrowband channel within the wideband channel, wherein the network comprises at least one other wireless terminal configured to operate in the entire wideband channel, and at least one access point (AP), wherein the AP is configured to support transmission and reception over the entire wideband channel, wherein the wideband channel is dividable into a plurality of resource units, the wireless terminal comprising:

processing circuitry; and memory containing instructions executable by the processing circuitry whereby the wireless terminal is configured to:

receive a trigger from the AP, wherein the trigger comprises an indication of a first resource unit and a second resource unit of the plurality of resource units on which the AP will transmit data intended to the wireless terminal using a dual carrier modulation (DCM) transmission;

measure a signal quality of the first and second resource units by measuring, in a frequency of the wideband channel corresponding to the first and second resource unit, a reception quality of data transmitted from the AP to the at least one other wireless terminal;

determine which of the first and second resource unit has a highest signal quality based on the measured signal quality; and receive the DCM-transmission on the resource unit determined to have the highest signal quality.

17. The wireless terminal of claim 16, wherein the plurality of resource units comprises 26, or 52, or 106 sub-carriers.

18. The wireless terminal of claim 16, wherein the first and the second resource units are not adjacent in frequency.

19. The wireless terminal of claim 16:

wherein the trigger further comprises a transmission time indication indicative of a time when the AP will transmit the DCM-transmission;

wherein the instructions are such that the wireless terminal is configured to:

measure the signal quality of the first and second resource units during a time period between receiving the trigger and the time indicated for the DCM-transmission indicated by the trigger; and listen for and reception of the DCM-transmission at the time indicated by the trigger.

20. The wireless terminal of claim 16:

wherein the AP encodes the DCM-transmission using a quadrature phase shift keying (QPSK) signal;

wherein the instructions are such that the wireless terminal is configured to receive the DCM-transmission in an in-phase component of the QPSK signal or in a quadrature-phase component of the QPSK signal;

wherein the trigger further comprises an indication informing the wireless terminal of which phase component the wireless terminal will receive the DCM-transmission in;

wherein the instructions are such that the wireless terminal is configured to receive the DCM-transmission in the indicated phase component.

21. The wireless terminal of claim 16, wherein the instructions are such that the wireless terminal is configured to:

receive a second trigger frame from the AP indicating whether the wireless terminal is allowed to transmit data in a coming uplink slot; and transmit the data in the uplink slot to the AP on the resource unit having the highest signal quality.

22. An access point (AP) configured to operate in a wireless network using at least one wideband channel, wherein the wireless network comprises at least a first wireless terminal configured to operate in a narrowband channel within the wideband channel, and at least one other wireless terminal configured to operate in the entire wideband channel, wherein the AP is configured to support transmission and reception over the entire wideband channel, wherein the wideband channel is dividable into a plurality of resource units, and wherein the AP arrangement comprises:

processing circuitry; and memory containing instructions executable by the processing circuitry whereby the AP is configured to:

determine a first and a second resource unit of the plurality of resource units to be used for transmitting data to the first wireless terminal using a dual carrier modulation (DCM) transmission;

transmit a trigger to the first wireless terminal, wherein the trigger comprises an indication of the first resource unit and the second resource unit on which the AP will transmit data intended to the first wireless terminal;

transmit data to the at least one other wireless terminal during a measurement period, wherein the data is transmitted in a frequency of the wideband channel, which includes the first and second resource units, and is suitable for measurement by the first wireless terminal of a signal quality of the first and second resource unit;

determine whether the measurement period has expired, and if so, transmit data intended to the first wireless terminal on the first and the second resource units using DCM-transmission.

23. The access point of claim 22, wherein the plurality of resource units comprises 26, or 52, or 106 sub-carriers.

24. The access point of claim 22, wherein the instructions are such that the AP is configured to determine the first and the second resource units such that they are not adjacent in frequency.

25. The access point of claim 22, wherein the trigger further comprises a transmission time indication indicative of when the AP will transmit the DCM-transmission on the indicated first and second resource units.

26. The access point of claim 22:
- wherein the instructions are such that the AP is configured to transmit the trigger to a second wireless terminal configured to operate in the narrowband channel within the wideband channel;
- wherein the trigger further indicates that the first and the second wireless terminals will receive the DCM-transmission on the first and the second resource units.

27. The access point of claim 26, wherein the instructions are such that the AP is configured to:
- encode the DCM-transmission using a quadrature phase shift keying (QPSK) signal;
- transmit the DCM-transmission to the first wireless terminal in an in-phase component of the QPSK signal and transmit the DCM-transmission to the second wireless terminal in a quadrature-phase component of the QPSK signal, or vice versa.

28. The access point of claim 27, wherein the instructions are such that the AP is configured to include, in the trigger, an indication informing the first and second wireless terminals of which phase component the respective wireless terminal will receive the DCM-transmission in.

* * * * *